United States Patent [19]
Duskin

[11] 3,742,663
[45] July 3, 1973

[54] PANEL BLOCKING

[75] Inventor: Fred E. Duskin, Garden Grove, Calif.

[73] Assignee: McDonnell Douglas Corporation, Santa Monica, Calif.

[22] Filed: Aug. 2, 1971

[21] Appl. No.: 168,490

Related U.S. Application Data

[63] Continuation of Ser. No. 869,123, Oct. 24, 1969, abandoned.

[52] U.S. Cl. .................................. 52/145, 52/618
[51] Int. Cl. ........................ E04b 1/82, E04c 2/32
[58] Field of Search .................... 52/617, 618, 613, 52/615, 625, 145, 630, 309

[56] References Cited
UNITED STATES PATENTS

| | | | |
|---|---|---|---|
| 963,889 | 7/1910 | Goodwin | 52/630 |
| 1,957,822 | 5/1934 | Denning | 52/618 |
| 2,280,647 | 4/1942 | Hawes | 52/618 |
| 2,576,530 | 11/1951 | Medal | 52/618 |
| 2,881,304 | 4/1959 | Dobson et al. | 52/618 |
| 3,003,599 | 10/1961 | Rubisson | 52/615 |
| 3,173,383 | 3/1965 | Eggert | 52/630 |
| 3,597,891 | 8/1971 | Martin | 52/145 |
| 3,227,598 | 1/1966 | Robb | 52/615 |

*Primary Examiner*—Frank L. Abbott
*Assistant Examiner*—James L. Ridgill
*Attorney*—Walter J. Jason, Donald L. Royer and Robert E. Richardson

[57] ABSTRACT

A molded filler material filling the voids between the nodes of dimples in a sheet of inner core double dimpled material having face sheets attached to the nodes of the dimples to form a high strength lightweight panel. This filler material forms pads having a plane surface abutting the undersurface of the face sheets and a contoured configuration abutting the core surfaces to provide a solid sandwich filler reinforcement between the face sheets at selected positions. These blocking material pads provide the desired strength and ridigity at points of attachment of the completed panel to other structure. Strips of stiffening material also may be placed throughout the interior of the panel as a means of reducing the vibration or changing vibration characteristics of the panel.

5 Claims, 4 Drawing Figures

PATENTED JUL 3 1973
3,742,663
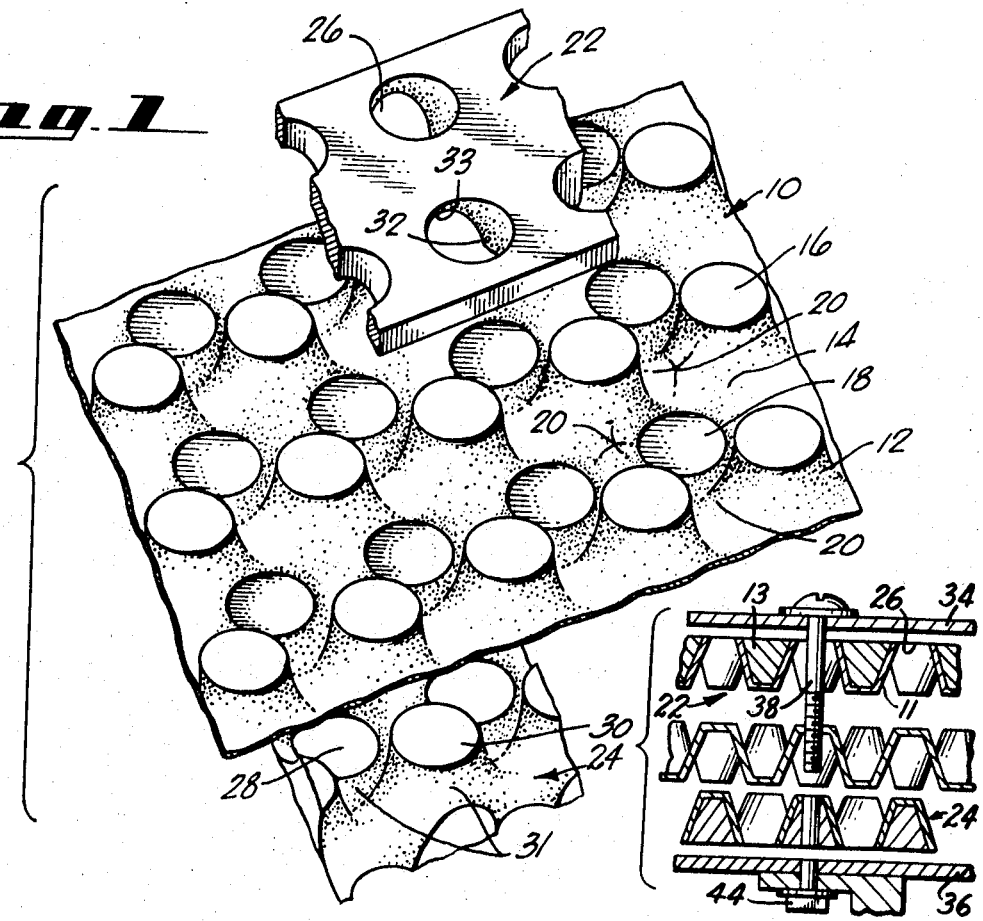
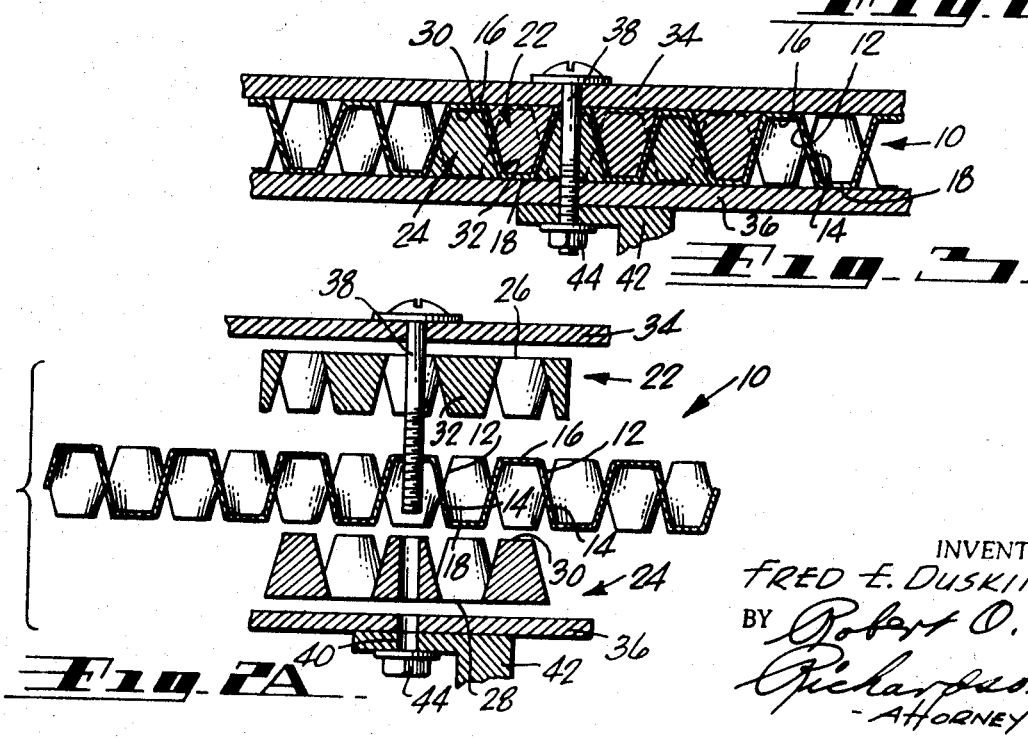
INVENTOR.
FRED E. DUSKIN
BY Robert O. Richardson
— ATTORNEY —

PANEL BLOCKING

RELATED APPLICATIONS

This application is a continuation of application Ser. No. 869,123 filed Oct. 24, 1969 for Panel Blocking, now abandoned.

BACKGROUND OF THE INVENTION

Strong lightweight panels are used in walls, floor and ceiling structures in buildings and vehicles where strong lightweight members are desired. One form of panel comprises an inner membrane having protruding nodes on each side of its plane surface to space and support cover sheets bonded thereto. This provides a sandwich having an inner core material between the two outer layers. While there are many such structures shown in the prior art, one such example is shown in copending patent application to Flyodd A. Martin for Interior Absorptive Panel now U.S. Pat. No. 3,597,891 and assigned to a common assignee. This core material bonded to the two outer layers provides an exceptionally strong lightweight panel, although it is desirable to have a reinforcing at points where the panel is then to be fastened to other structure. At such points, the core material is cut out and a solid piece of blocking is placed in the position thus provided. This blocking transmits the entire fastener load into the facings which tends to delaminate the panel.

It has been found, in addition to the provisions of reinforcement pads where desired for the mounting of a panel to a structure, that additional stiffening material may be placed throughout the panel to reduce vibration and change vibration characteristics of the panel for selected applications.

SUMMARY OF THE INVENTION

A molded filler material forming pads or strips is placed on both sides of an inner core having flattened protrusions alternately formed on opposite surfaces of the core. These pads or strips are placed at selected points where fastening of the completed panel to some other structure is desired or where the vibrational characteristics of the panel need to be defined or controlled. These pads or strips have flat outer surfaces which abut the inner surfaces of face sheets when the sheets are fastened thereto. The pads or strips have appropriate openings through which the nodes of the flattened protrusions are positioned for bonding to the outer face sheets. The bonding of the outer faces to the nodes of the flattened protrusions complete the lightweight high strength panel. The solid area or block formed by the molded pads on each side of the core permits fastener loads to be distributed into the core and faces, placing the blocking bond partly into shear rather than completely in tension.

BRIEF DESCRIPTION OF THE DRAWINGS

FIG. 1 is a fragmentary exploded perspective view of an inner core double dimpled with blocking pads on each side;

FIG. 2 is an exploded elevational view showing the relationship of the panel and panel blocking together with means for mounting the panel to a mounting structure;

FIG. 2A is a similar view in which an alternate form of panel blocking is used; and FIG. 3 is an elevational view of a completed panel assembly mounted to the structure.

DESCRIPTION OF THE PRESENT EMBODIMENT

Referring now to the drawings there is shown in FIG. 1 an inner core material 10 formed from a single flat sheet and which has upwardly extended protrusions 12 and opposite or downwardly extending protrusions 14. These protrusions may be formed by striking, stamping or indenting under suitable heat and/or pressure as required for the material used. These protrusions 12 and 14 terminate in flattened surfaces or nodes 16, 18 having a configuration similar to the protrusions of the device used in forming these core protrusions. In the embodiment shown, the upwardly extended protrusions 12 are in a row with the walls of adjacent protrusions extending in the same direction meeting in a saddle 20 which is in the plane of the original sheet before it was dimpled. This portion of saddle 20 has a vertical U-shaped configuration. The downwardly extended protrusions 14 are also in a row with their adjacent walls also meeting in saddle 20. This portion of saddle 20 intersects the first mentioned portion at the base of the U and has an inverted U-shaped configuration. Saddle 20 is also a mid-point between the upwardly extending protrusions 12 and the downwardly extending protrusions 14. This core material 10 and the method of making it is known in the prior art and forms one element of the present combination.

Special molded panel blocking pads 22 and 24 having apertures 26, 28 therein are adapted to fit over the nodes 16 and 18 of dimples 12 and 14 of core 10. These pads are flat on their outer surfaces so that they may be readily bonded to the inner surfaces of the face sheets as will be seen in FIGS. 2, 2A and 3. The surface of pad 24, facing upwardly from the underneath of core material 10 has a configuration that is substantially identical to that of the undersurface of the core material 10. This surface is provided with openings 28 which are adapted to fit over the downwardly projected nodes 18 of core 10. Pad 24 also has upwardly directed nodes 30 adapted to fit within and underlie nodes 16 of core 10. Saddles 31 on pad 24 underlie saddles 20 on core 10.

Similarly pad 22 is adapted to fit over the upwardly projected protrusions 12. Pad 22 has downwardly projecting nodes 32 adapted to fit within the cavity of node 18 of core 10 and openings 26 are provided to receive the upwardly directed nodes 16 of core 10. Saddles 33 on pad 22 overlie saddles 20 on core 10. When pads 22 and 24 are positioned with core 10 in between, a solid unitary construction is presented. The pads may be of any desired length or width and may be positioned at selected points along the core 10 before the outer face sheets are attached.

Pads 22 and 24 may be made with a potting compound such as epoxy, plastic putty, plastic wood filler or the like. It may be a rigid foam polyurethene and may be made with a closed die. In FIG. 2 is shown an, alternate form of this panel blocking material made by filling one side of a piece of core material 11 which is similar to the inner core material 10. This side is filled; up to the level of the upwardly directed node and then shaving or planing the top surface down until the node 16 is removed, leaving the opening 26. This material may then remain within the core material 11 as a pad. In the alternative, the core material 11 in the composite may be removed, leaving the filler material 13 only as the pad. This material may then be cut into desired sizes and placed at selected positions on both sides of the inner core. The potting compound also may be poured in place on the inner core as another alternate method.

Referring now to FIG. 2A there is shown the inner core material 10 between two blocking pads 22 and 24 which in turn are between outer facing sheets 34, 36. Pad 22 has downwardly directed protrusions 32 adapted to fit within the cavities of downwardly directed protrusions 14 of core 10. These protrusions 32 are of slightly less length than the distance between the upper and lower nodes 16 and 18 of core 10 in order to permit upper node 16 of core 10 to pass through the opening 26 of pad 22 and be bonded to the inner surface of upper face sheet 34. Similarly the lower pad 24 has upwardly directed protrusions 30 that fit within the cavity of upper protrusion 12 of core 10 and is of such length that it will permit the surface of node 18 of core 10 to pass through the opening 28 of pad 24 in order to be bonded to the inner surface of panel 36. The section in FIG. 2A is such that alternate upper and lower protrusions of core 10 are seen, making the saddles hidden from view. A bolt 38 is adapted to pass through face sheets 34, 36, pads 22, 24 and core 10. Bolt 38 is of such length that it will pass through aperture 40 on mounting bracket 42 and it may be retained by nut 44 for mounting of the completed panel to the mounting bracket 42.

Reference is now made to the elevational view shown in FIG. 3 wherein the panel is fully assembled and is mounted to the support bracket. Here can be seen the core material 10 with its alternate upper protrusions 12 and lower protrusions 14 terminating in nodes 16 and 18 respectively. These nodes abut the inner surfaces of face sheets 34, 36 and are bonded thereto. In the area of the panel where bolt 38 affixes the panel to a supporting structure 42 are the panel blocking pads 22, 24 positioned on opposite sides of the core 10. The upwardly directed node 30 on pad 24 fits within the cavity defined by the core upper node 16 and the downwardly directed node 32 on upper pad 22 fits within the core lower node 18. A nut 44 on bolt 38 completes the mounting.

While the panel blocking is shown in the area of the mounting to the mounting support 42 it is to be understood that strips or squares of blocking material may be dispersed throughout the panel as desired for reinforcement and to change or control its vibration characteristics through changes in its rigidity.

I claim:

1. In combination, a panel having a center sheet of core material with protrusions extending outwardly on both sides,
   a blocking material comprising a second sheet of core material having similar protrusions to those on said center sheet except that the outer ends on one side thereof are removed to provide apertures therein to permit abutment of said face sheets to said protrusions on said center sheet with said second sheet positioned therebetween, and
   filler material between said second sheet and said face sheet to provide a solid filler reinforcement at selected points on said panel,
   said filler material substantially filling the cavities formed by those protrusions extending outwardly from the other side of siad second sheet and the space between protrusions of the second sheet on the same side as said material,
   said filler material having outer flat surfaces with apertures therein in alignment with said apertures on said second sheet,
   said filler material and said second sheet forming a blocking pad readily separable from said center sheet for alternate placement thereon as desired before securing one of said face sheets thereover.

2. A panel as set forth in claim 1 wherein said filler material forms strips placed at selected points on said panel for greater rigidity and to establish desired vibrational characteristics thereto.

3. A panel blocking material as in claim 1 wherein a third sheet and filler material forms a second blocking pad for use on the other side of said center sheet.

4. A panel having a high strength-to-weight ratio comprising:
   a center sheet of core material having protrusions extending outwardly on both sides thereof,
   face sheets secured to the outermost extremities of said protrusions,
   a second and third sheet of core material,
   filler material between said second and third sheets and said face sheets to provide solid filler reinforcement blocking pads at selected points on said panel,
   said second and third sheets and said filler material having apertures therein through which said protrusions are positioned for attachment to said face sheets,
   walls of adjacent protrusions on said core material forming a saddle configuration having a U and inverted-U intersection at the plane of the sheet of core material, said filler material having flat surfaces along the planes of said protrusions and surfaces along said core material of said second and third sheets abutting with and substantially conforming with said saddle configuration,
   said filler material and second and third sheets on each side of said center sheet substantially filling the cavities formed by those protrusions extending outwardly from the other side of said center sheet and the space between protrusions of the center sheet on the same side as said material,
   said filler material having outer flat surfaces with apertures therein and in said second and third sheets through which protrusions on the same side of the center sheet core as said filler material and second and third sheets are positioned and attached to said face sheets.

5. A panel as set forth in claim 3, said blocking pads, said face sheets and said center sheet having an aligned aperture therein for receiving a fastening means for securing said panel to a support structure,
   said blocking pads being placed at points of attachment of said panel to said support structure.

* * * * *